United States Patent
Akman et al.

(10) Patent No.: US 12,052,177 B1
(45) Date of Patent: *Jul. 30, 2024

(54) APPARATUS AND METHOD FOR PROVIDING HYBRID ACCESS COORDINATION

(71) Applicant: Netsia, Inc., Santa Clara, CA (US)

(72) Inventors: Arda Akman, Istanbul (TR); Burcu Yargicoglu, Istanbul (TR)

(73) Assignee: Netsia, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,512

(22) Filed: Jul. 23, 2021

Related U.S. Application Data

(63) Continuation of application No. 16/541,465, filed on Aug. 15, 2019, now Pat. No. 11,075,844.

(51) Int. Cl.
*H04L 41/0816* (2022.01)
*H04L 41/5025* (2022.01)
*H04L 43/0882* (2022.01)
*H04L 47/20* (2022.01)
*H04L 47/2416* (2022.01)
*H04L 47/2425* (2022.01)

(52) U.S. Cl.
CPC ...... *H04L 47/2425* (2013.01); *H04L 41/0816* (2013.01); *H04L 41/5025* (2013.01); *H04L 43/0882* (2013.01); *H04L 47/20* (2013.01); *H04L 47/2416* (2013.01)

(58) Field of Classification Search
None
See application file for complete search history.

(56) References Cited

U.S. PATENT DOCUMENTS

| | | |
|---|---|---|
| 2015/0339136 A1 | 11/2015 | Suryanarayanan et al. |
| 2016/0380884 A1 | 12/2016 | Sarikaya et al. |
| 2017/0118081 A1 | 4/2017 | Rius I Riu et al. |

(Continued)

FOREIGN PATENT DOCUMENTS

| | | |
|---|---|---|
| WO | 2019116076 A1 | 6/2019 |
| WO | 2020038618 A1 | 2/2020 |

OTHER PUBLICATIONS

Samdanis et al., "From Interworking to Hybrid access Systems and the Road toward the Next-Generation of Fixed-Mobile Convergence", Mar. 1, 2017, IEEE Communications Standards Magazine (Year: 2017).*

(Continued)

*Primary Examiner* — Jenkey Van
(74) *Attorney, Agent, or Firm* — Shumaker & Sieffert, P.A.

(57) ABSTRACT

A hybrid access configuration function (HACF) is deployed as a virtual or physical network function (V/PNF) that can reconfigure the capacity of access network devices based on HCPE usage demands, and/or perform traffic engineering by switching to best access paths based on packet flow's service requirements or by shifting traffic from one sub-flow to another. This is achieved by HACF's direct interfaces to various device control functions, including control and management functions of RAN, SON, PON, and SMF, as well as the control function of HAG/HCPE to manage resources. Furthermore, HACF can create new instances of virtual HAGs at the access network closer to the user clusters when extra HAG capacity is needed.

16 Claims, 8 Drawing Sheets

(56) References Cited

U.S. PATENT DOCUMENTS

| | | |
|---|---|---|
| 2019/0045562 A1 | 2/2019 | Liu et al. |
| 2019/0089623 A1 | 3/2019 | Dion et al. |
| 2019/0182363 A1 | 6/2019 | Bonaventure et al. |
| 2020/0288212 A1 | 9/2020 | Alvarez Dominguez et al. |
| 2020/0396155 A1 | 12/2020 | Molla et al. |
| 2020/0404540 A1* | 12/2020 | Kerpez ............. H04W 28/0268 |
| 2021/0167987 A1* | 6/2021 | Saltsidis ........... H04W 28/0231 |

OTHER PUBLICATIONS

Keukeleire et al., "Increasing broadband reach with Hybrid Access Networks", Jul. 10, 2019, arxiv.org (Year: 2019).*

Condoluci et al., "Fixed Mobile Convergence in the 5G Era: from Hybrid Access to Converged Core", Feb. 7, 2019, IEEE Network (Year: 2019).*

Corrected Notice of Allowance from U.S. Appl. No. 17/384,530 dated Mar. 31, 2023, 2 pp.

Notice of Allowance from U.S. Appl. No. 17/384,530 dated Mar. 16, 2023, 12 pp.

Notice of Allowance from U.S. Appl. No. 17/384,530 dated Jul. 6, 2023, 2 pp.

Hybrid Access Broadband Network Architecture, Broadband Forum Technical Report TR 348, Issue 1, Jul. 2016, 9pgs.

Ford et al., "TCP Extensions for Multipath Operation with Multiple Addresses," RFC 6824, Jan. 2013, 64pgs.

3rd Generation Partnership Project; Technical Specification Group Services and System Aspects; Telecommunication management; Study on management and orchestration of network slicing for next generation network, TR 28.801, 15.1.0, Jan. 2018, 79pgs.

5G; System Architecture for the 5G System, 3GPP TS23.501, v15.2.0, release 15, Jun. 2018, 219 pgs.

Leitao et al., "Fixed Convergence Towards the 56 Era: Convergence 2.0", IEEE Conference on Standards for Communications and Networking, 2016 (Year: 2016).

Condoluci et al., "Fixed-Mobile Convergence in the 5G Era: From Hybrid Access to Converged Core", IEEE Network, Apr. 2019 (Year: 2019).

Samdanis et al, "From Interworking to Hybrid Access Systems and the Road toward the Next Generation of Fixed-Mobile Convergence", IEEE Communications Standards Magazine, Mar. 2017 (Year: 2017).

Keukeleire et al., "Increasing Broadband Reach with Hybrid Access Networks," arXiv.org, Jul. 2019 (Year: 2019).

Prosecution History for U.S. Appl. No. 16/541,465, dated Dec. 28, 2020 to Mar. 22, 2021, 20 pp.

\* cited by examiner

APPARATUS AND METHOD FOR PROVIDING HYBRID ACCESS COORDINATION

CROSS REFERENCE

This application is a continuation of U.S. patent application Ser. No. 16/541,465, filed Aug. 2019, the entire contents of which is incorporated herein by reference.

BACKGROUND OF THE INVENTION

Field of Invention

The present invention relates to a system and method for providing multi-access capacity and traffic engineering and coordination across 3GPP and multiple access technologies.

Discussion of Related Art

Any discussion of the prior art throughout the specification should in no way be considered as an admission that such prior art is widely known or forms part of common general knowledge in the field.

The last mile is the access component of a telecommunications network that physically reaches to user's premises. Currently, there are many last mile options that service providers offer to its customers such as Digital Subscriber Loop (DSL), fiber-optic, cable, cellular and WiFi. However, each of these technologies is capacity constrained due to technological and/or geographical limitations. Furthermore, the wide use of professional applications, Internet telephony, collaborative applications, social networking and video applications greatly increased the bandwidth requirements in the recent years. Insufficient bandwidth for such applications reduces user's efficiency, productivity and enjoyment.

In order to increase the last mile capacity, the service provider must install more DSL Access Multiplexers (DSLAM) and wiring closets for DSL, build more base station towers for cellular, or install more underground fiber, which are all highly expensive and time-consuming. One consideration to remedy the problem is so-called 'hybrid access' (also referred to as 'multi access'), which is the simultaneous use of multiple last mile technologies by the customer premises equipment (CPE). Particularly, the use of 3GPP access along with fixed broadband access has been the new direction. Note that the LTE and 5G networks can now provide broadband cellular access to user devices. The main driver is not only to provide higher throughput/capacity for users by leveraging multiple networks, but also to increase the access network reliability under network failures and to provide less impact during service turn-up for users.

Hybrid CPE (HCPE) is a term used for a new type of CPE that can support one or more broadband interfaces (such as DSL and fiber) as well as one or more 3GPP interfaces for access. The HCPE can simply be a user device—such as a computer or smart phone, or it can be a home/office gateway to which all local user devices attach. In addition, a new logical function, Hybrid Access Gateway (HAG), is defined for deployment within the service provider's network. The HAG implements the corresponding network side aggregation for Hybrid Access services. One HAG in the network can support a large number of HCPE. If HAG is deployed in a 3GPP service provider's network, it can be deployed in a distributed manner as a virtual HAG (vHAG), just like the other VNFs, in the core network or in the access network closer to base stations. Both HAG and HCPE are configurable with policies for use of multiple network technologies and instrumented for measurement of access path (last mile) performance and for reporting to their respective EMSs. Broadband Forum's TR-348 document titled, "Hybrid Access Broadband Network Architecture," recites all the details of Hybrid Access architecture, and therefore will not be repeated here in detail. However, portions of the document that are relevant to the invention will be briefly described.

The main task of HCPE is splitting user's IP packets into multiple sub-flows when sending them out to the access network, and receiving multiple sub-flows from the network and aggregating them into a single flow before sending it to the user equipment. The splitting is achieved either by using various tunneling methods at layer 3 (IP) that are applicable to both wire-line and 3GPP networks, or by using Multi-path TCP at layer 4.

TCP protocol is a prior-art Layer 4 protocol built over Internet Protocol (IP) that provides reliable communications between endpoints. It handles packets that are lost, duplicated or received out of order. TCP performs Flow Control (FC) by the receiver of the TCP packet sending an acknowledgment (ACK) back to the sender, which contains a so-called "window" which indicates the maximum number of bytes the sender is allowed to transmit before receiving further permission. This feedback mechanism allows the receiver to adjust the amount of data transferred by the sender. Furthermore, the ACK mechanism built into TCP works along Congestion Control (CC) to determine the packet send rate to prevent congestion.

Today, many endpoints have multiple data communication interfaces and therefore multiple IP addresses. For example, a laptop is often equipped with both wired and wireless interfaces, and a smartphone often has the capability to use multiple wireless communication technologies. Using regular TCP, these devices are capable of establishing multiple simultaneous TCP connections, with each connection tied to one specific IP interface and one application's use. In other words, each TCP connection is bound to a single path defined by the IP addresses of the connection's endpoints. Multipath TCP (see IETF's RFC 6824, titled, "TCP Extensions for Multipath Operation with Multiple Addresses") is a set of extensions to TCP protocol that allows a TCP connection to use multiple paths simultaneously for the same application. A packet flow is divided into sub-flows, and aggregated into a single Multipath TCP connection. A Multipath TCP connection provides a bidirectional byte stream between two end-points communicating like normal TCP and, does not require any change to the applications. However, Multipath TCP enables the use of different paths with different IP addresses to exchange packets belonging to the MPTCP connection. Although a MPTCP connection appears just like a normal TCP connection to an application, each sub-flow looks like a regular TCP flow at the network layer. The number of sub-flows that are managed within a Multipath TCP connection is not fixed and it can even fluctuate during the lifetime of the Multipath TCP connection.

One of the primary technical challenges facing service providers today is the ability to deliver a wide array of network performance characteristics which future applications and services will demand. To name a few, bandwidth, latency, packet loss, security, and reliability will greatly vary from one service to the other. Emerging applications such as remote operation of robots, massive IOT, and self-driving cars require connectivity, but with vastly different characteristics. The combination of architecture flexibility, software programmability, and the needs of different business segments (medical, factories, military, public safety, etc.) and applications have led to the creation of the concept of network slicing. A network slice provides a way to completely segment the network to support a particular type of service or business. Furthermore, each slice can be optimized according to capacity, coverage, connectivity, security and performance characteristics. Since the slices can be isolated from each other, as if they are physically separated both in the control and user planes, the user experience of the network slice will be the same as if it was a separate network. A network slice can span all domains of the network including the software applications running on network nodes, specific configurations of the core transport network, access network configurations as well as the end devices. 3GPP standards architected a sliceable 5G infrastructure to provide many logical network segments over a common single physical network (see 3GPP's TR 28.801 document titled, "Telecommunication management; Study on management and orchestration of network slicing for next generation network"). Technologies such as software defined networking (SDN) wherein control plane (CP) and user plane (UP) are separated, and network function virtualization (NFV) are the key enablers for breaking up traditional network structures. With network slicing, customizable and virtualized network components can be stitched together, using only software, to provide the right level of connectivity.

In configuring a network slice, the last mile, meaning the access network, presents the biggest challenge because of potential bottlenecks due to lack of capacity. The Hybrid Access architecture that allows the use of multiple access technologies simultaneously and distributing an application's packet stream into sub-flows using tunneling or MPTCP is a practical solution. Each access network slice may have both the 3GPP Radio Access Network (RAN) as well as wireline broadband such as DSL, WiFi or fiber-optic managed by the same (or different) operator. Depending on the slice's quality of service requirements, the sub-flow distribution to different access technology options can be orchestrated. The access network can be more economically configured as Wi-Fi as opposed to cellular, depending on location; fiber-optic may be more ubiquitous at one specific site than radio, etc. Of course, the delivery methods of a slice that correspond the same or similar level quality of service (QoS) are different across these technology segments. While 3GPP access must account for the high mobility of users, and thus frequently adjusting slice parameters across many base stations, the non-3GPP access such as fiber-optic may be preferred when there is need for high capacity for non-mobile devices such as IOT. Most non-3GPP access network technology components nowadays provide SDN-like control capabilities by using control plane and data plane separation. For example, in Passive Optical Networks (PON), a controller is implemented that can assign Optical Network Units (ONUs) to users, each ONU to an Optical Line Termination Equipment (OLT), and furthermore, allocate buffer resources of OLT and ONUs to properly serve different traffic types. Similarly, other non-3GPP technologies such as WiFi access networks support SDN's separated control and user planes. RAN slicing is also well addressed in prior art.

3GPP standardization efforts have gone into defining specific slices and their requirements based on application/service type. For example, the user equipment (UE) can now directly specify its desired slice using a new field in the packet header called Network Slice Selection Assistance ID (NSSAI). A subfield of NSSAI is Slice/Service Types (SST) that is used to indicate the slice type. The standards already defined most commonly usable network slices and reserved the corresponding standardized SST values (see ETSI TS 23.501). For example, SST values of 1, 2 and 3 correspond to slice types of enhanced Mobile Broadband (eMBB), ultra-reliable and low-latency communications (uRLLC) and massive IoT (MIoT), respectively. The Access and Mobility Management Function (AMF) of the core network retrieves the slices that are allowed by the user's subscription and interacts with the Network Slice Selection Function (NSSF) of the core network to select the appropriate network slice instance for that traffic on the RAN. 3GPP specified Slice Management Function (SMF) for 5G as a new virtual network management function that belongs to OSS/BSS layer whose sole role is to deliver an appropriate slice to the user/application after authenticating it.

According to an aspect of this invention a new network function called Hybrid Access Coordination Function, HACF or in short Hybrid Access Coordinator, HAC is defined to coordinate the delivery of access bandwidth and quality of service in-real time in a hybrid access network with multiple access technologies according to network slice requirements and policies. HACF has (a) up to date and complete topological view of the access network, including all HCPEs, vHAGs and all the connections in between a pair of HCPE-vHAG including access network devices (base stations, ONUs, OLTs, DSLAMs, etc.), and (b) up to date utilization of each topological entity. The HACF may be responsible for a particular access network/cloud, or a group of access networks. It provides the capability to change the utilization of each access technology option at the HCPE, or it can add or remove capacity into access network devices to instantly respond to traffic needs without violating policies and slice requirements. In order to fulfil this role, HACF has interfaces to other key virtual network functions for slice management, Policy Decision Point (PDP) function for policy enforcement, and EMS/management function of access network device's user plane function. Furthermore, HACF must have interfaces to management of access network devices to gather topology information.

More specifically, HACF collects four types of key information in real time:
(a) Access link usage indicators (e.g., percentages) of each access link connected to a HCPE forming the CPE-side of the access network. This information is gathered and reported by the EMS of HCPE or potentially gathered at the network side of the access link, and/or an OSS;
(b) Access network device usage indicators (e.g., percentages) of each network device such as base station, DSLAM, ONT, etc. forming the network-side of the access network. This information is gathered and reported by the EMS of the network equipment, and/or an OSS;
(c) Topology information of the access network including connectivity between all CPE-side and network-side components of the access network including Hybrid Access Gateways (HAGs). This information is gathered from the controllers of network-side equipment, and/or an OSS;
(d) Slice QoS information is gathered from the Slice Management Function (SMF).
(e) Policies and rules for each or group of HCPE usage of capacity. This information is gathered from PDPs.

Using the information above, the HACF oversees the access network utilization vis a vis each HCPE's service needs, available access network capacity, slice QoS (to which HCPE belongs) and makes adjustments to shift traffic between access links, use other access link types or add/remove access network capacity.

In one embodiment of the HACF, the following key methods are supported:

Method I: Reconfiguring access usage parameters of HCPE:
  Step 1: HACF detects a performance threshold violation on one of the access links of HCPE.
  Step 2: HACF re-distributes the traffic to use available access capacity of the other links and determines if the redistribution eliminates the bottleneck.
  Step 3: HACF sends the re-distribution parameters to PDP.
  Step 4: PDP communicates with HCPE/HAG to re-distribute traffic accordingly.

Method II: Reconfiguring extra capacity on network-side access device and/or slice:
  Step 1: HACF determines that access link capacity is insufficient to eliminate the bottleneck using Method I.
  Step 2: HACF calculates the needed extra capacity on the access links and communicates the capacity need to respective OSS of the network-side access component.
  Step 3: OSS configures the requested extra capacity on network-side access component and/or slice.

Method III: Selecting best access link technology based on slice QoS:
  Step 1: HACF determines the optimum access link type(s) based on slice QoS specified by Slice Management Function.
  Step 2: HACF calculates the needed capacity on these access links and communicate with PDP function.
  Step 3: PDP configures the HCPE/HAG.

Method IV: Activating new vHAG:
  Step 1: HACF determines that the existing vHAG capacity does not meet the demand. It determines the location and capacity of a new vHAG. This function is activated as a VNF on an existing hardware platform (a switch or a server) in the access network, simply meaning no new hardware installation is required.
  Step 2: HACF communicates the capacity and location to the NMS/OSS of the HAG/HCPE (also called the 'HA controller').
  Step 3: NMS/OSS activates the new vHAG.

Embodiments of the present invention are an improvement over prior art systems and methods.

SUMMARY OF THE INVENTION

In one embodiment, the present invention provides a method as implemented in hybrid access network, the hybrid access network comprising a plurality of hybrid access customer premises equipment (HCPEs), at least one hybrid access gateway (HAG), and a hybrid access controller (HA Controller), the HA controller managing and configuring the plurality of HCPEs and HAG, wherein at least a first access link and a second access link are attached to a given HCPE in the plurality of HCPEs, the first access link associated with a first broadband access technology and the second access link associated with a second broadband access technology, the given HCPE distributing user packet data traffic between the first and second access links, the method re-reconfiguring the utilization of the first and second access links in real-time, the method as implemented in the HA controller and a hybrid access configuration function (HACF) comprising the steps of: (a) the HA controller receiving performance information associated with the first and second access links as reported by either the given HCPE or the HAG, wherein the HA Controller forwards the received performance information to the HACF, (b) the HACF detecting a performance threshold violation of packet data traffic on either the first or second access links attached to the given HCPE; (c) the HA controller receiving new re-distribution parameters from the HACF, the new re-distribution parameters calculated by HACF to re-distribute packet traffic to use available access capacity of one of the first or second access links; and (d) the HA controller directing the given HCPE and/or the HAG to apply the new re-distribution parameters received in (c).

In another embodiment, the present invention provides a method as implemented in hybrid access network, the hybrid access network comprising a plurality of hybrid access customer premises equipment (HCPEs), at least one hybrid access gateway (HAG), and a hybrid access controller (HA Controller), the HA controller managing and configuring the plurality of HCPEs and HAG, wherein at least a first access link and a second access link are attached to a given HCPE in the plurality of HCPEs, the first access link associated with a first broadband access technology and the second access link associated with a second broadband access technology, the given HCPE distributing user packet data traffic between the first and second access links, the method re-reconfiguring the utilization of the first and second access links, the method reconfiguring capacity of an access device at the network-end of a given access link among the first and second access links by increasing a capacity of an access slice serving the given access link to increase utilization of either the first and/or second access link in real-time using, the method as implemented in the HA controller and a hybrid access configuration function (HACF) comprising the steps of: (a) the HA controller receiving performance information associated with the first and second access links as reported by either the given HCPE or the HAG, wherein the HA Controller forwards the received performance information to the HACF, (b) the HACF detecting a performance threshold violation of packet data traffic on either the first or second access links attached to the given HCPE; (c) the HACF calculating additional capacity needed on the given access link to increase a capacity by increasing a capacity of the access device at the network-end of the given access link, and/or by increasing another capacity of the access slice serving the given access link; (d) the HA controller receiving, from the HACF, the calculated additional capacity; and (e) the HA controller communicating and instructing the access device at the network-end of the given access link to activate the calculated additional capacity.

In yet another embodiment, the present invention provides a method as implemented in a hybrid access network, the hybrid access network comprising a plurality of hybrid access customer premises equipment (HCPEs), at least one virtual hybrid access gateway (vHAG) implemented as a virtual network function (VNF) and located in the hybrid access network, and a hybrid access controller (HA Controller), the HA controller managing and configuring the plurality of HCPEs and vHAG, wherein at least a first access link and a second access link are attached to a given HCPE in the plurality of HCPEs, the first access link associated with a first broadband access technology and the second access link associated with a second broadband access technology, the given HCPE distributing a user packet traffic between the first and second access links, the method for adding a new vHAG in real-time comprising the steps of: (a) reporting performance of the first and second access links of the given HCPE and/or vHAG along with vHAG capacity utilization information to the HA Controller, and by the HA Controller to a HA Configuration Function (HACF); (b) detecting, by HACF, a performance threshold violation and a need to activate the new vHAG in a specific location in the hybrid access network to eliminate the violation; and (c) sending, by HACF, a request to the HA Controller to instantly activate the vHAG at the specific location.

In another embodiment, the present invention provides a system implemented in a hybrid access network that comprises a plurality of hybrid access customer premises equipment (HCPEs), at least one virtual hybrid access gateway (vHAG) implemented as a virtual network function (VNF), the vHAG located in the hybrid access network or a hybrid access gateway (HAG), and a hybrid access controller (HA Controller) that can manage and configure said plurality of HCPEs and at least one vHAG, wherein at least a first access link and a second access link are attached to a given HCPE in the plurality of HCPEs, each of the first and second access links connected to an access device at a network-side, the access device associated with a controller, the system comprises: (a) a first subfunction to calculate redistribution parameters of packet data traffic in the hybrid access network in real-time based on reported performance measurements of the first and second access links; (b) a second subfunction to calculate required additional (i) capacity of access device and/or one or more access slices at the network-side based on reported performance measurements of first and second access links, and (ii) location of a new vHAG, in real-time based on reported performance measurements of the first and second access links and the vHAG; (c) a first database storing topology of the hybrid access network indicating at least all access link connections between plurality of HCPEs, at least one vHAG, new vHAG, the access device, and the one or more access slices at the network-side; and (d) a second database storing information on HCPEs, at least one vHAG, new vHAG, the access device, and the one or more access slices at the network-side, and QoS of slices associated with the first and second access links.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
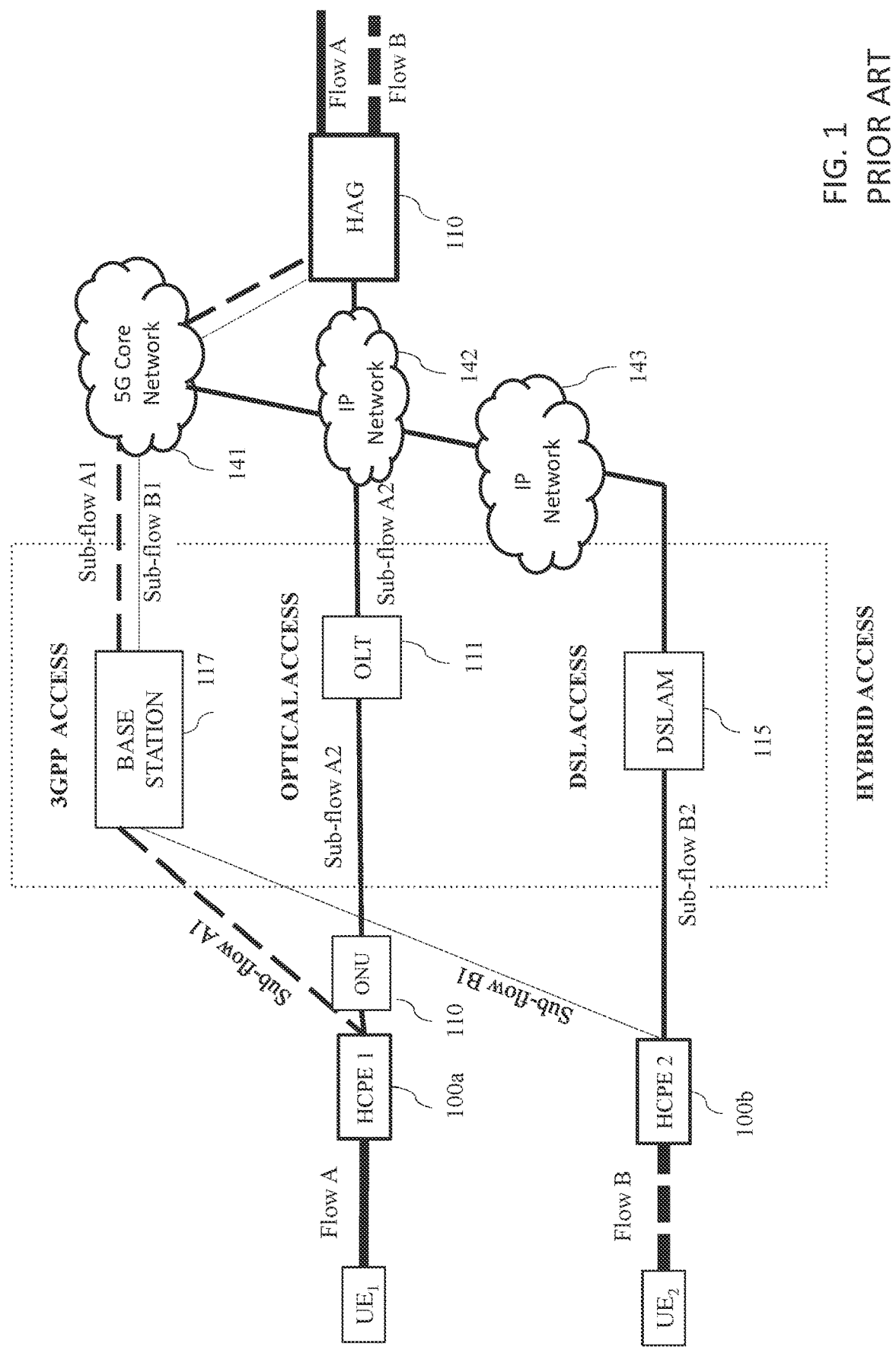
FIG. 1 illustrates an exemplary hybrid access configuration with HAG (prior art).

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a base station, switch, SMF, HACF, controller, etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a base station, switch, controller, optical line termination, gateway or host is a piece of networking component, including hardware and software that communicatively interconnects with other equipment of the network (e.g., other network devices, and end systems). Switches provide network connectivity to other networking equipment such as switches, gateways, and routers that exhibit multiple layer networking functions (e.g., routing, layer-3 switching, bridging, VLAN (virtual LAN) switching, layer-2 switching, Quality of Service, and/or subscriber management), and/or provide support for traffic coming from multiple application services (e.g., data, voice, and video). User Equipment (UE) is generally a user device such as a cellular phone, or a sensor, or a computer or another type of equipment that wirelessly and with-wire connects to a network.

Any physical device in the network has a type, location, ID/name, Medium Access Control (MAC) address, and Internet Protocol (IP) address. Furthermore, a physical device can host a collection of VNFs or PNFs, each identified by a virtual port number and/or virtual IP address. The HACF, SMF, SDN controller, OSS/BSS or any VNF/PNF can be on a single computer or distributed across multiple computers identified by at least an IP address, MAC address and one or more Port numbers.

Note that while the illustrated examples in the specification discuss mainly 5G networks relying on SDN (as Internet Engineering Task Force [IETF] and Open Networking Forum [ONF] defined), and NFV (as European Telecommunications Standards Institute (ETSI) defined), embodiments of the invention may also be applicable in other kinds of network (mobile and non-mobile) that are sliceable.

The present invention provides three new methods applicable to a Hybrid Access network comprised of a plurality of Hybrid Access CPEs (HCPE)s, at least one Hybrid Access Gateway (HAG) and a Hybrid Access Controller (HA Controller) that can manage and configure said plurality of HCPEs and HAG, wherein there are at least two access links attached to each HCPE, a first access link using a first broadband access technology and a second access link using a second broadband access technology, said HCPE distributing a user's packet data traffic between said access links, said broadband access technologies are 3G, 4G, 5G, WiFi, DSL, cable, fiber optic and satellite. The first method is re-reconfiguring the utilization of said links in real-time using the steps of: (a) reporting of the performance of first and second links by the HCPE and/or HAG to HA Controller, and by HA Controller to HA Configuration Function (HACF), (b) detecting, by HACF, a performance threshold violation of packet data traffic on one of the access links attached to one of said plurality of HCPEs, (c) packet data traffic new re-distribution ratios calculated, by HACF, to use available access capacity of one of said access links, (d) sending, by HACF, the re-distribution parameters to HA Controller, and (e) directing, by HA Controller the HCPE and/or HAG to apply said new re-distribution ratios. The second method is reconfiguring capacity of the access device at the network-end of one or plurality of the broadband access link and/or by increasing the capacity of the access slice serving said at least one access link to increase the utilization of at least one said access link in real-time using the steps of: (a) reporting of the performance of first and second links by the HCPE and/or HAG to HA Controller, and by HA Controller to HA Configuration Function (HACF), (b) detecting, by HACF, a performance threshold violation of a packet data traffic on one of the access links attached to one of the HCPE, (c) additional capacity need on at least one of said access link calculated, by HACF, to increase the capacity of said at least one access link by increasing the capacity of access device at the network-end of said at least one access link, and/or by increasing the capacity of the access slice serving said at least one access link, (d) sending, by HACF, the calculated additional capacity to the Controller of said access device and/or access slice, (d) communicating by said Controller of said access device to activate additional capacity. The third method comprises adding a new vHAG in real-time using the steps of: (a) reporting of the performance of first and second links of a plurality of HCPEs and/or vHAG along with vHAG capacity utilization information to HA Controller, and by HA Controller to HA Configuration Function (HACF), (b) detecting, by HACF, a performance threshold violation and the need to activate another vHAG in a specific location in the access network to eliminate the violation, (c) sending, by HACF, a request to HA Controller to instantly activate a vHAG at said location.

FIG. 1 illustrates an exemplary prior art network with three types of hybrid access, namely, 3GPP, optical and DSL. A single service provider may own all three types of access, or a service provider may own only one type of access while other(s) may own other types of access in which case, the service provider who offers hybrid access may lease a slice from the other service provider(s)' network. All such business model variations are covered by this invention. Two user equipment, UE1 and UE2 are illustrated that use hybrid access. HCPE 100a is located at the site of UE1 while HCPE 100b is located at the site of UE2. HCPE 100a has two access interfaces: one towards the 3GPP access network and one towards the optical access network. Similarly, HCPE 100b has two access interfaces: one towards the 3GPP network and one towards the DSL network.

Network-side devices comprise: for 3GPP access network, base station 117, for the optical access network, ONU 110 and OLT 111, for the DSL access network, DSLAM 115. Each one of these network-side devices may be connected to different IP networks. For example, base station 117 connects to mobile operator's core network 141, OLT connects to an Internet service provider's IP network 142 and DSLAM 115 connects to a DSL access provider's IP network 143. In other embodiments, depending on the business model, IP networks 141, 142 and 143 may not be different networks.

HAG 110 is the aggregation device for traffic that uses hybrid access, and is attached to IP network 142. Since IP networks 141, 142 and 143 are interconnected, HAG 110 is obviously reachable by both HCPE 100a and 100b. In this simple example, HCPE 100a splits the traffic of UE1 into two sub-flows: Sub-flow A1 that uses the 3GPP access network, and Sub-flow A2 that uses optical access network. Similarly, HCPE 100b splits the traffic of UE2 into two sub-flows: Sub-flow B1 that uses the 3GPP access network, and Sub-flow B2 that uses DSL access network. Therefore, sub-flows A1 and B1 traverse base station 117 and the core network 141, sub-flow A2 traverses optical access network via ONU 110, OLT 111 and then IP network 142, and sub-flow B2 traverses DSL access network via DSLAM 115 and then IP network 143. Since the HAG is attached to IP network 142, sub-flows A1 and A2 traverses first core network 141 and second, IP network 142 to reach the HAG. Similarly, sub-flow B2 traverses first IP network 143 and then IP network 142 to reach the HAG. The sub-flows A1 and A2, and B1 and B2 are combined at HAG, before the flows reach destination.

Figure 2:
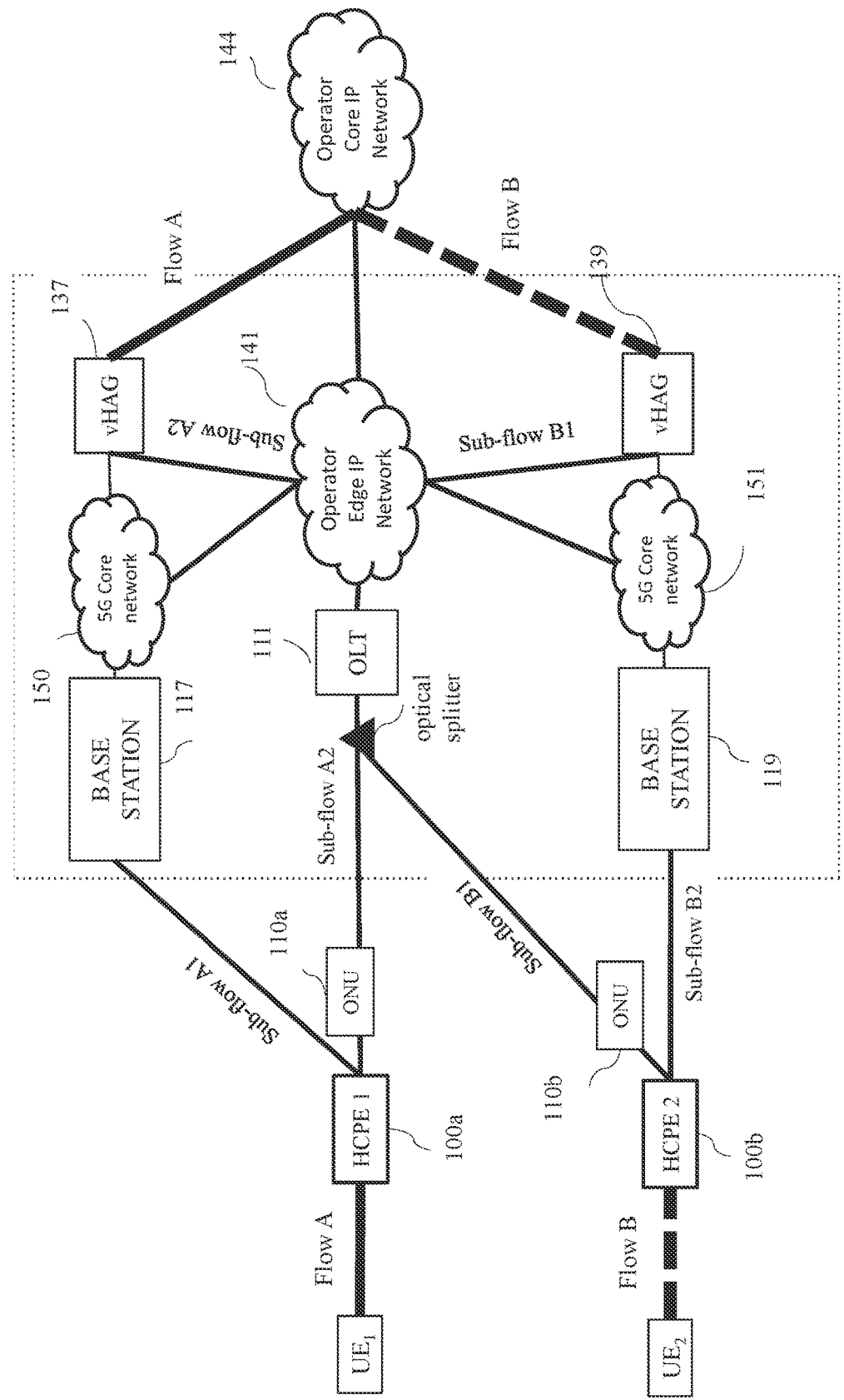
FIG. 2 illustrates another exemplary hybrid access configuration with virtual HAG.

FIG. 2 depicts a more specialized hybrid access configuration alternative that uses virtual HAG (vHAGs) that are deployed at the edge, i.e., at the access network, in contrast to a HAG that is deployed at the core network as illustrated in FIG. 1. In this exemplary configuration, a 3GPP service provider offers both 3GPP and optical access. Base stations 117 and 119 provide the 3GPP access. ONU 110a and 110b attached to OLT 111 provide a simple optical access network, also managed by the 3GPP operator. ONU 110a and 110b are normally at the user equipment's site adjacent to HCPE 100a and 100b, respectively. Base stations 117 and 119 connect to local core networks 150 and 151, respectively, and virtual HAGs 137 and 139 are attached to these core networks as illustrated in the diagram. OLT 111 connects to operator's edge IP network 141, which is in turn connected to core networks 150 and 151. vHAGs 137 and 139 are connected to the operator edge IP network 141 as well. Operator edge IP network 141 is connected to operator central core network 144, and vHAGs 137 and 139 are connected to Operator central core network 144 either directly or through Operator edge IP network 141. Comparing the configurations of FIGS. 1 and 2, the key difference is deploying HAG function as a virtual function (V/PNF) at the network edge/access as opposed to deploying it at the network core. Doing so, the network operator can instantiate as many vHAG instances at the access as the need requires. Furthermore, all sub-flows are aggregated at the access network by vHAGs, which may better manage the delay difference between multiple sub-flows of the same flow (the aggregated Flow A and B are illustrated in FIG. 2). The delay difference, otherwise, may be significant when the sub-flows traverse both the access and wide area networks. As the more vHAG capacity is needed in the network with the growing traffic demand, new VNFs can be instantly activated at strategic access locations in the local core networks, and if feasible, closest to new user clusters. Each new vHAG can be activated on a virtual machine readily configured on an off-the-shelf server or switch platform in the network, i.e., without requiring any delay for hardware installation or software configuration. In contrast, using a HA would require a long cycle of specialized hardware platform procurement, installation, and activation.

Figure 3:
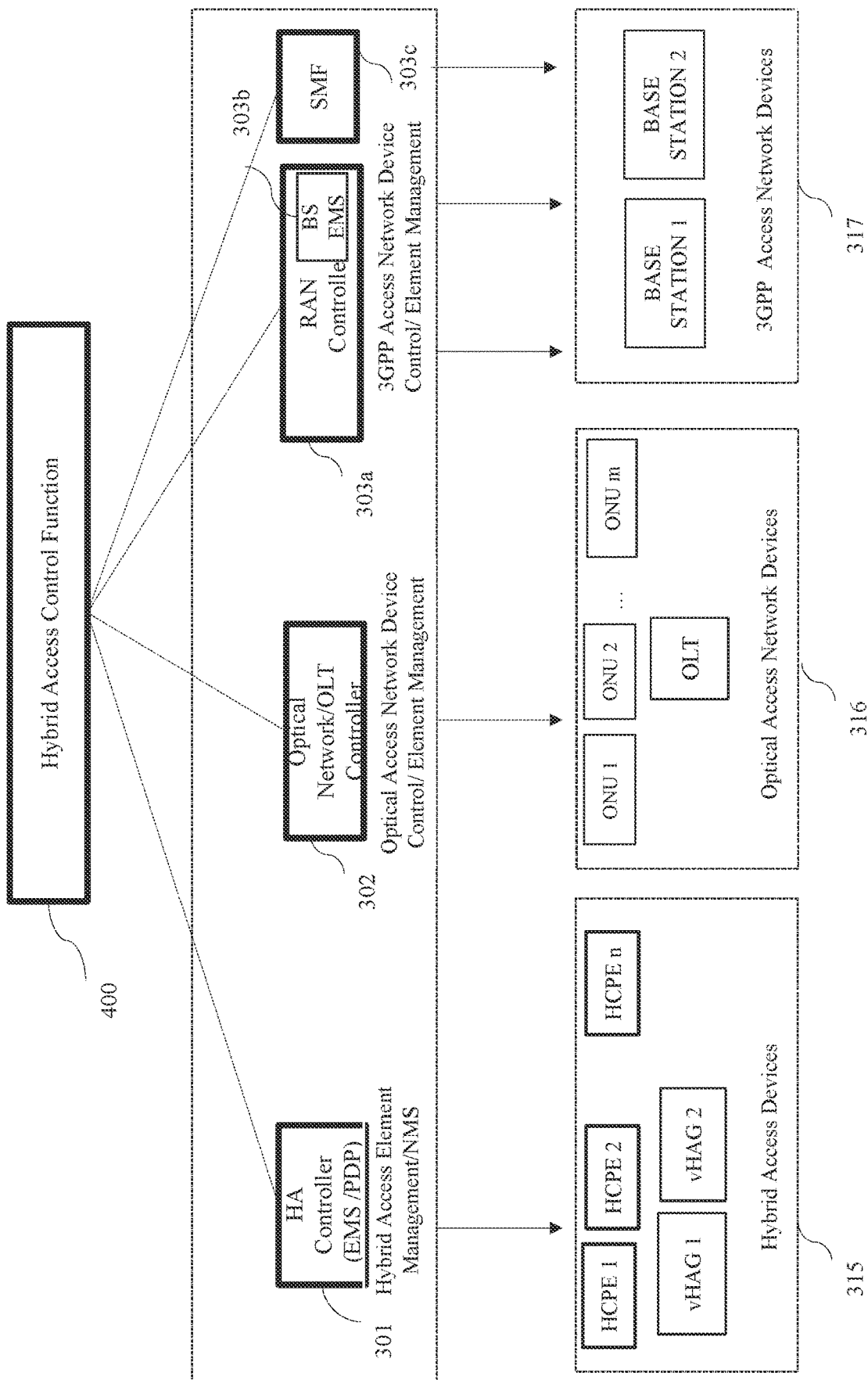
FIG. 3 illustrates the HACF interfaces to different control and element management functions.

Hybrid Access Control Function (HACF), according to an aspect of this invention, connects to various control and network/element management functions (NMS/EMS), policy functions and Operation Support Systems (OSS)s of the access network as illustrated in FIG. 3. Hybrid access devices are HCPE and vHAG (or HAG) shown as a group in box 315 that are all managed by Hybrid Access Element Management Systems and PDP function 301. The group of systems involved in box 315 is named in short 'HA Controller'. These functions may be on the same or different computers. Optical network access devices are multiple ONUs and one or more OLTs are shown as a group in box 316 that are all managed by Optical Access Network Device Network and Element Management Systems 302 (OLT Controller in short). Again, these functions may be on the same or different systems. Although the HA Controller and Controllers of different access technologies are shown as RAN Controller and OLT Controller, etc. HA Controller can be interpreted in general to cover all Control components of different access technologies.

3GPP access network devices are multiple base stations shown as a group in box 317 that are all managed by Radio Access Network (RAN) controller 303a, which includes Base Station Element Management System 303b, and Slice Management Function (SMF) 303c that is separately shown. Again, all these functions may be on the same or different systems. There may be one or more instances of the functions 301, 302 and 303 depending on service provider's implementation. Furthermore, some of these systems may be in a different service providers' network domain, for example, when the hybrid access service provider leases capacity of a certain type of access from another access technology provider. The HACF function interfaces to functions 301, 302, 303a, 303b and 303c to gather information about access network topology and utilization, and to send commands to change access network configuration and traffic distribution.

Figure 4:
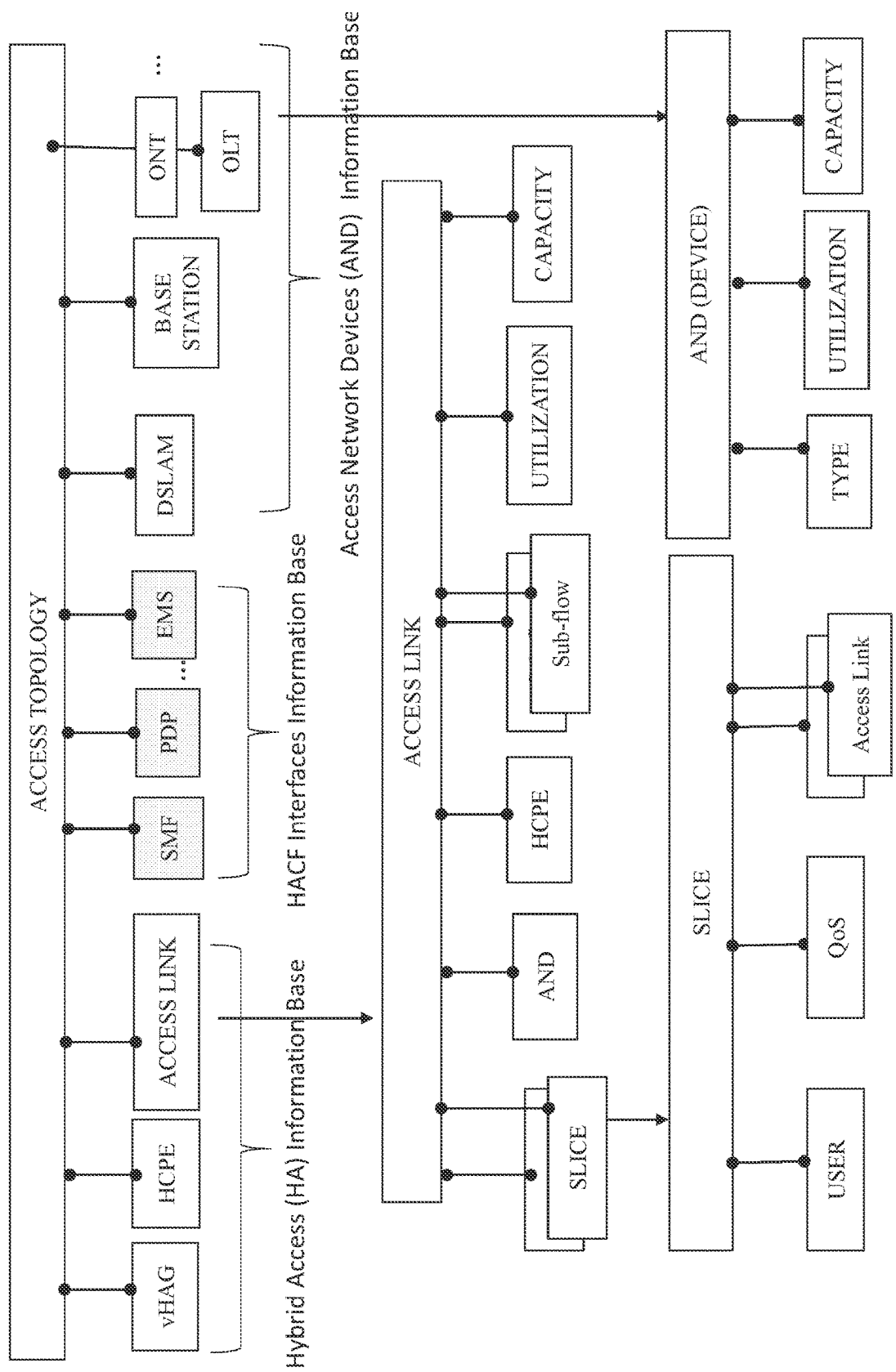
FIG. 4 illustrates an exemplary HACF information model.

FIG. 4 illustrates an exemplary Information Model for an embodiment of the system of invention. Other information models that model or group information in other ways is also possible and assumed to be covered by this invention. The HACF has a Topology Information Base (TIB) that has data representing the key elements of the network, containing Hybrid Access Information Base (HAIB), HACF interfaces Information Base (HIB) and Access Network Device (AND) Information Base (ANDIB). The Access Link Information Base (ALIB) and Slice Information Base (SIB) are other key Information Bases. The ALIB has elements such as link utilization, link capacity, the devices at the two end points of the access link, and the list of sub-flows assigned to that link, etc. The SIB has elements such as slice user, access links assigned to the slice, slice QoS including slice bandwidth, etc. The ANDIB has elements such as device type, utilization and capacity.

Figure 5:
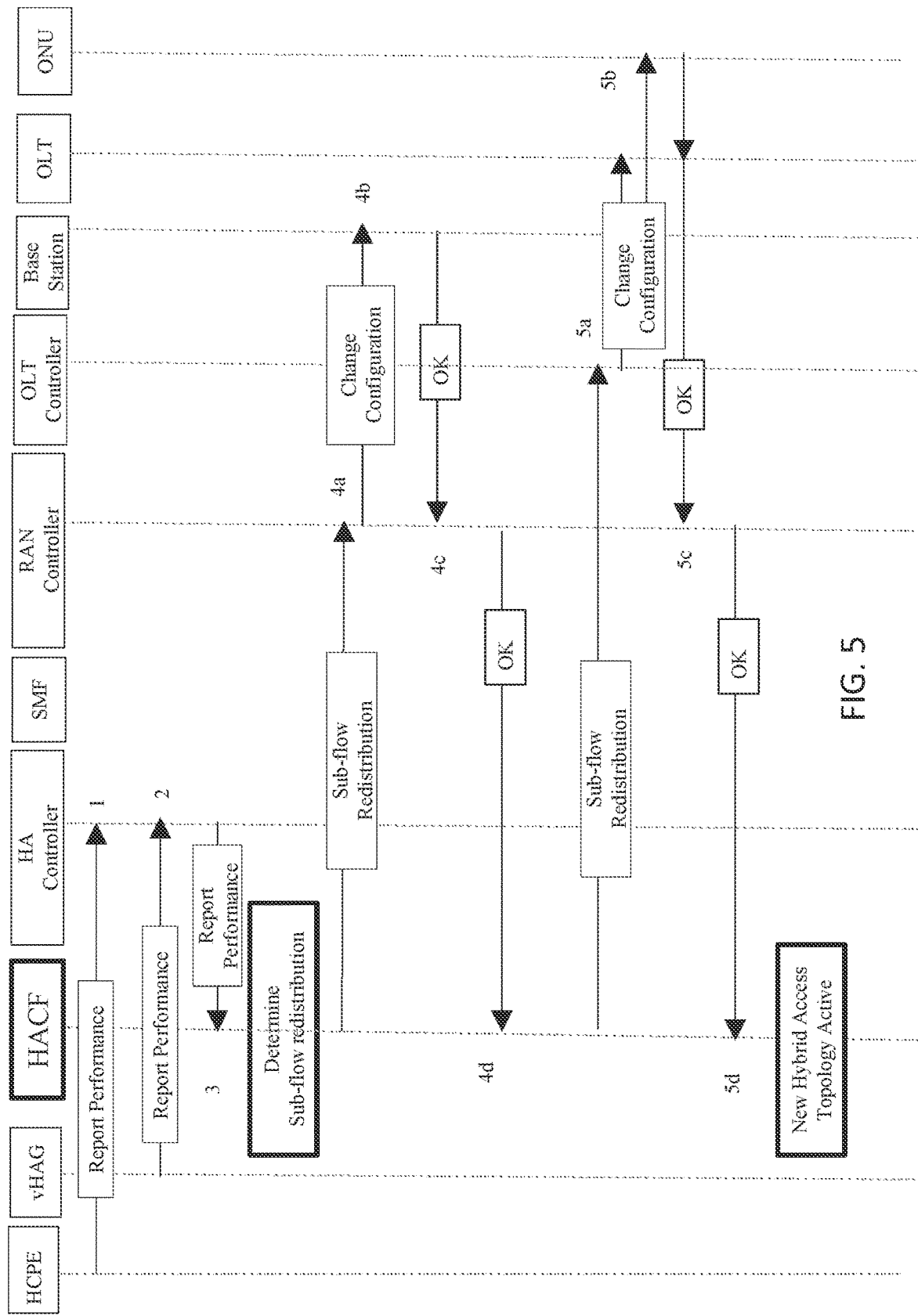
FIG. 5 is a simple messaging diagram for traffic redistribution between sub-flows in the hybrid access network of FIG. 2.

A simple messaging scenario illustrating the steps for rearranging the use of access links is illustrated in FIG. 5. In steps 1 and 2, HCPE and/or vHAG report to HA Controller the performance of an access link—as perceived by them. In step 3, HA Controller either detects a performance threshold violation on the access link and reports to HACF, or it simply reports the performance data to HACF and HACF in turn detects the performance threshold violation. This event may simple be a performance threshold violation applicable to a specific type/category/slice of traffic that has stringent QoS requirements or may be a threshold violation that impacts all types of traffic on that specific access link. The HACF determines the re-distribution parameters of some or all the traffic across various access links based on (a) current access link and device utilizations, (b) access network topology, and (c) access link and device capacities. In steps 4a and 5a, HACF informs RAN controller and OLT (Optical) controller to redistribute the traffic according to the new distribution parameters, respectively. Alternatively, it may inform the HA Controller. Subsequently, in steps 4b and 5b, RAN controller and OLT controller send configuration messages to underlying base station(s) and OLT, respectively. After RAN controller and OLT controller receiving successful execution of the new configuration in steps 4c and 5c, from base station and OLT respectively, they send OK to HACF in steps 4d and 5d, marking the successful activation of the traffic redistribution. After the re-distribution, HACF continues to listen to events from underlying controllers to ensure that the new redistribution eliminated the bottleneck.

Figure 6:
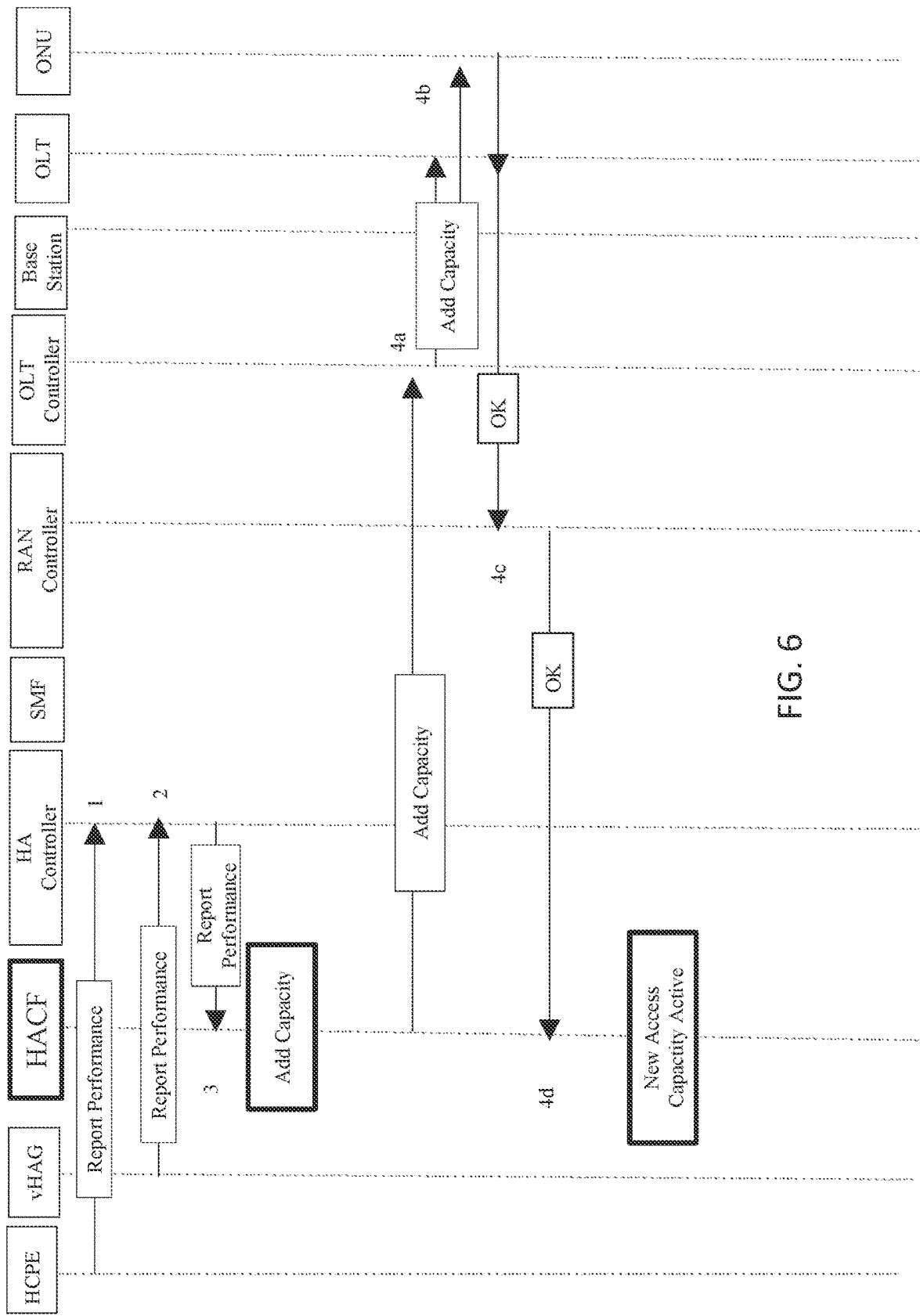
FIG. 6 is a simple messaging diagram for increasing hybrid access capacity in the hybrid access network of FIG. 2.

A simple messaging scenario illustrating the steps for increasing access link/device capacity is illustrated in FIG. 6. In steps 1 and 2, HCPE and/or vHAG report to HA Controller the performance of an access link—as perceived by them. In step 3, HA either detects a performance threshold violation on the access link and reports to HACF, or it simply reports the performance data to HACF and HACF in turn detects the performance threshold violation. This event may simple be a performance threshold violation applicable to a specific type/category/slice of traffic that has stringent QoS requirements or may be a threshold violation that impacts all types of traffic on that access link. The HACF determines that re-distribution of traffic does not solve the problem and hence new capacity must be activated on some access devices. This determination is made based on (a) current access link and access device utilizations, (b) access network topology, (c) link and device capacities, and (d) link and device capacity costs. In step 4a, HACF informs OLT (Optical) controller to add capacity to the OLT or a specific ONU. Subsequently, in step 4b, OLT controller sends configuration messages to the OLT. After the OLT controller receiving successful execution of the newly added capacity in step 4c from the OLT, it sends an OK to HACF in step 4d, marking the successful activation of the newly added capacity/topology. After the capacity augmentation, the HACF continues to listen to events from underlying controllers to ensure that the new capacity eliminated the bottleneck. Different optimization methodologies using linear, nonlinear or integer programming with various cost functions and constraints for capacity augmentation and traffic engineering are known in prior art and thus, not recited here.

Figure 7:
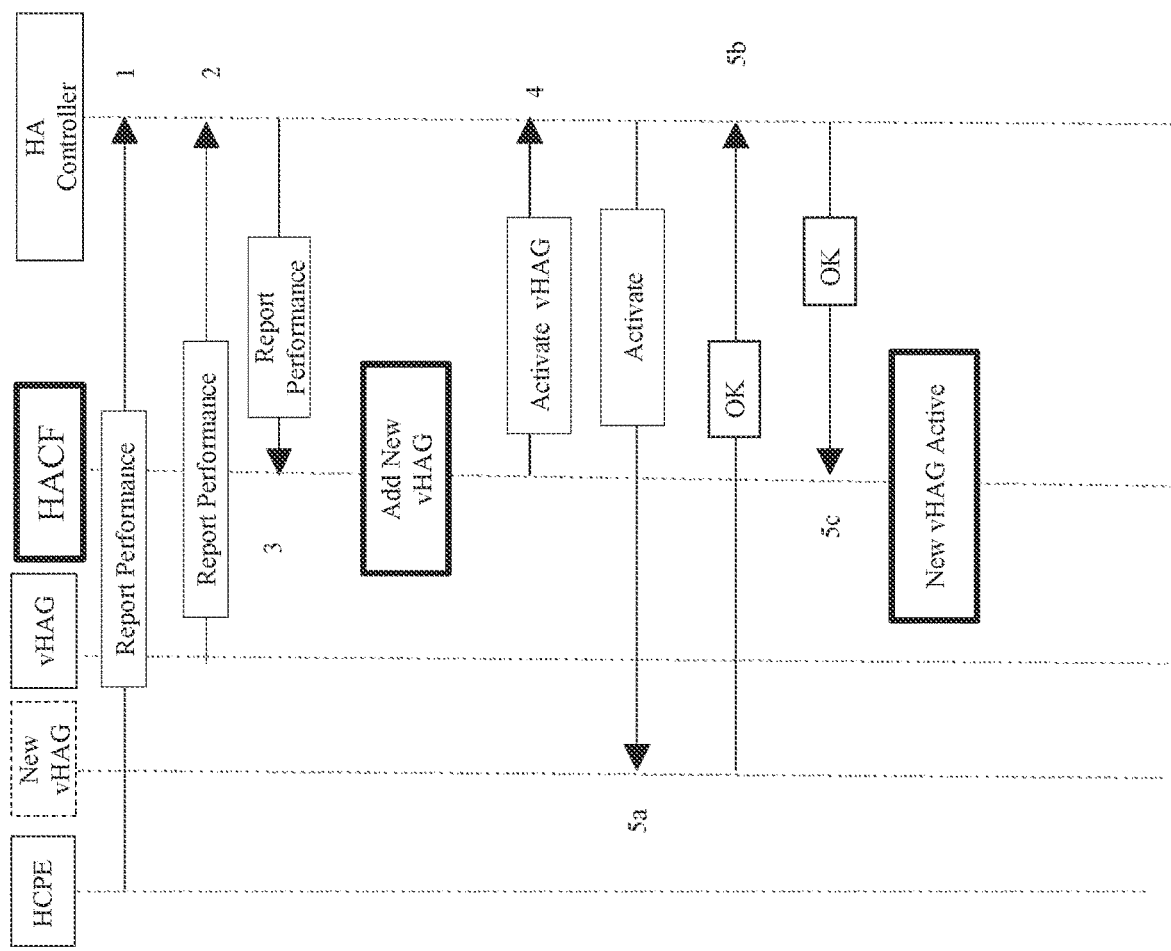
FIG. 7 is a simple messaging diagram for activating a new vHAG in the hybrid access network of FIG. 2.

A simple messaging scenario illustrating the steps for increasing vHAG capacity by adding a new vHAG is illustrated in FIG. 7. In steps 1 and 2, HCPE and/or vHAG report to HA Controller the performance of an access link—as perceived by them. In step 3, HA either detects a performance threshold violation on the access link and reports to HACF, or it simply reports the performance data to HACF and HACF in turn detects the performance threshold violation. This event may simple be a performance threshold violation applicable to a specific type/category/slice of traffic that has stringent QoS requirements or may be a threshold violation that impacts all types of traffic on that access link. The HACF determines that neither re-distribution of traffic nor adding new access device capacity can solve the problem. New vHAG capacity must be activated. This determination is made based on (a) current access link utilizations, (b) access network topology, (c) active vHAG capacities and locations, (d) virtual machine capacities and locations available for new vHAG activations, and (e) vHAG activation costs. In step 4, HACF requests HA controller to activate the new vHAG. In step 5a, HA controller activates the new vHAG. After the HA controller receiving successful execution of the newly activated vHAG in step 5b, it sends an OK to HACF in step 5c, marking the successful activation of the newly added vHAG. After this capacity augmentation, the HACF continues to listen to events from underlying controllers to ensure that the new vHAG eliminated the bottleneck. Different optimization methodologies using linear, nonlinear or integer programming with various cost functions and constraints for capacity augmentation and traffic engineering are known in prior art and thus, not recited here.

Figure 8:
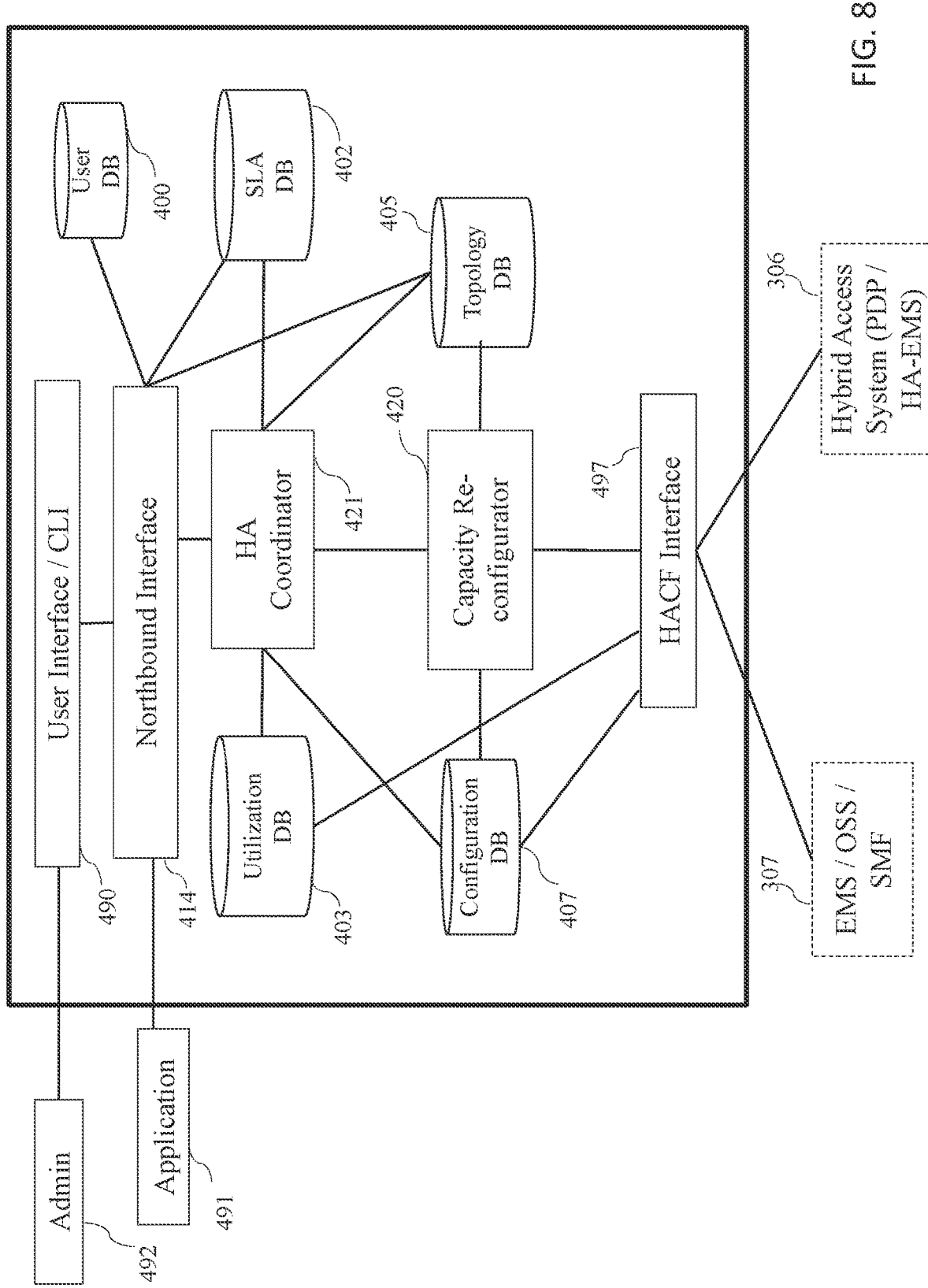
FIG. 8 illustrates a high-level system block diagram of HACF.

A simple block diagram of HACF is illustrated in FIG. 8. There are two core functions, Capacity Re-configurator 420 and HA Coordinator 421. Various data elements of the Information Model that are needed for functions 420 and 421 are stored in databases 400, 402, 403, 405, and 407. Capacity Re-configurator 420 makes a determination if new capacity must be activated on access network devices (ONU, OLT, Base station, DSLAM, etc.) to meet the access traffic needs, when traffic re-distribution can't solve the problem. This function also makes a determination if a new vHAG is needed at a particular location, or an existing inactive vHAG capacity must be activated. HA Coordinator 421 performs traffic re-distribution across different access technology options and for different traffic flows to optimize the traffic performance or to more optimally use the access network capacity without causing traffic performance degradation. Both functions 420 and 421 may use prior art optimization algorithms, artificial intelligence, machine learning or deep learning.

The HACF has three groups of key interfaces (a) HACF Interfaces 497 to downstream controllers and OSS/EMS/NMS controlling the device layer, (b) User interface/CLI 490 for system administrator 492, and (c) Northbound API 414 towards application 491 using HACF. HACF interfaces are grouped as interfaces to (a) HA Controller/OS S/EMS/PDP and (b) AND Controllers/OS S/EMS and SMF.

In one embodiment, the present invention provides a method as implemented in hybrid access network, the hybrid access network comprising a plurality of hybrid access customer premises equipment (HCPEs), at least one hybrid access gateway (HAG), and a hybrid access controller (HA Controller), the HA controller managing and configuring the plurality of HCPEs and HAG, wherein at least a first access link and a second access link are attached to a given HCPE in the plurality of HCPEs, the first access link associated with a first broadband access technology and the second access link associated with a second broadband access technology, the given HCPE distributing user packet data traffic between the first and second access links, the method re-reconfiguring the utilization of the first and second access links in real-time, the method as implemented in the HA controller comprising the steps of: (a) receiving performance information associated with the first and second access links as reported by either the given HCPE or the HAG, wherein the HA Controller forwards the received performance information to a hybrid access configuration function (HACF), and wherein the HACF detects a performance threshold violation of packet data traffic on either the first or second access links attached to the given HCPE; (b) receiving new re-distribution parameters from the HACF, the new re-distribution parameters calculated by HACF to re-distribute packet traffic to use available access capacity of one of the first or second access links; and (c) directing the given HCPE and/or the HAG to apply the new re-distribution parameters received in (b).

In another embodiment, the present invention provides a method as implemented in hybrid access network, the hybrid access network comprising a plurality of hybrid access customer premises equipment (HCPEs), at least one hybrid access gateway (HAG), and a hybrid access controller (HA Controller), the HA controller managing and configuring the plurality of HCPEs and HAG, wherein at least a first access link and a second access link are attached to a given HCPE in the plurality of HCPEs, the first access link associated with a first broadband access technology and the second access link associated with a second broadband access technology, the given HCPE distributing user packet data traffic between the first and second access links, the method re-reconfiguring the utilization of the first and second access links, the method reconfiguring capacity of an access device at the network-end of a given access link among the first and second access links by increasing a capacity of an access slice serving the given access link to increase utilization of either the first and/or second access link in real-time using, the method as implemented in the HA controller comprising the steps of: (a) receiving performance information associated with the first and second access links as reported by either the given HCPE or the HAG, wherein the HA Controller forwards the received performance information to a hybrid access configuration function (HACF), and wherein the HACF detects a performance threshold violation of packet data traffic on either the first or second access links attached to the given HCPE, and the HACF calculating additional capacity needed on the given access link to increase a capacity by increasing a capacity of the access device at the network-end of the given access link, and/or by increasing another capacity of the access slice serving the given access link; (b) receiving, from the HACF, the calculated additional capacity; and (c) communicating and instructing the access device at the network-end of the given access link to activate the calculated additional capacity.

In yet another embodiment, the present invention provides a method as implemented in a hybrid access network, the hybrid access network comprising a plurality of hybrid access customer premises equipment (HCPEs), at least one virtual hybrid access gateway (vHAG) implemented as a virtual network function (VNF) and located in the hybrid access network, and a hybrid access controller (HA Controller), the HA controller managing and configuring the plurality of HCPEs and vHAG, wherein at least a first access link and a second access link are attached to a given HCPE in the plurality of HCPEs, the first access link associated with a first broadband access technology and the second access link associated with a second broadband access technology, the given HCPE distributing a user packet traffic between the first and second access links, the method for adding a new vHAG in real-time comprising the steps of: (a) reporting performance of the first and second access links of the given HCPE and/or vHAG along with vHAG capacity utilization information to the HA Controller, and by the HA Controller to a HA Configuration Function (HACF); (b) detecting, by HACF, a performance threshold violation and a need to activate the new vHAG in a specific location in the hybrid access network to eliminate the violation; and (c) sending, by HACF, a request to the HA Controller to instantly activate the vHAG at the specific location.

In another embodiment, the present invention provides a system implemented in a hybrid access network that comprises a plurality of hybrid access customer premises equipment (HCPEs), at least one virtual hybrid access gateway (vHAG) implemented as a virtual network function (VNF), the vHAG located in the hybrid access network or a hybrid access gateway (HAG), and a hybrid access controller (HA Controller) that can manage and configure said plurality of HCPEs and at least one vHAG, wherein at least a first access link and a second access link are attached to a given HCPE in the plurality of HCPEs, each of the first and second access links connected to an access device at a network-side, the access device associated with a controller, the system comprises: (a) a first subfunction to calculate redistribution parameters of packet data traffic in the hybrid access network in real-time based on reported performance measurements of the first and second access links; (b) a second subfunction to calculate required additional (i) capacity of access device and/or one or more access slices at the network-side based on reported performance measurements of first and second access links, and (ii) location of a new vHAG, in real-time based on reported performance measurements of the first and second access links and the vHAG; (c) a first database storing topology of the hybrid access network indicating at least all access link connections between plurality of HCPEs, at least one vHAG, new vHAG, the access device, and the one or more access slices at the network-side; and (d) a second database storing information on HCPEs, at least one vHAG, new vHAG, the access device, and the one or more access slices at the network-side, and QoS of slices associated with the first and second access links.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for providing hybrid access coordination. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method comprising:
   receiving, by a hybrid access configuration function (HACF) for a hybrid access network comprising a hybrid access customer premises equipment (HCPE) and a hybrid access gateway (HAG), first performance information for a first access link for a first access network operating according to a first broadband access technology;
   in response to detecting, by the HACF based on the first performance information, a performance threshold violation impacting packet data traffic on the first access link, computing by the HACF, distribution parameters for redistributing packet data traffic from the first access link to a second access link for a second access network operating according to a second broadband access technology; and
   outputting, by the HACF, the distribution parameters to a controller that manages one or more access devices to cause the controller to reconfigure the one or more access devices to forward packet data traffic according to the redistributing of the packet data traffic from the first access link to the second access link,
   wherein outputting the distribution parameters to the controller comprises one or more of:
      outputting, by the HACF, one or more of the distribution parameters to a radio access network (RAN) controller to cause the RAN controller to reconfigure a base station to forward packet data traffic according to the redistributing of the packet data traffic from the first access link to the second access link; or
      outputting, by the HACF, one or more of the distribution parameters to an optical line termination (OLT) controller to cause the OLT controller to reconfigure one or more of an Optical Network Unit (ONU) or an OLT equipment to forward packet data traffic according to the redistributing of the packet data traffic from the first access link to the second access link.

2. The method of claim 1,
   wherein the one or more access devices comprises the HCPE,
   wherein the HCPE is coupled to the first access link and the second access link,
   wherein receiving the first performance information comprises receiving, by the HACF, the first performance information from the HCPE, and
   wherein outputting the distribution parameters to a controller comprises outputting, by the HACF, one or more of the distribution parameters to a hybrid access (HA) controller that manages the HCPE to cause the HA controller to reconfigure the HCPE to forward packet data traffic according to the redistributing of the packet data traffic from the first access link to the second access link.

3. The method of claim 1,
   wherein the one or more access devices comprises the HAG,
   wherein the HAG is coupled to the first access link and the second access link, wherein receiving the first performance information comprises receiving, by the HACF, the first performance information from the HAG, and
   wherein outputting the distribution parameters to a controller comprises outputting, by the HACF, one or more of the distribution parameters to a hybrid access (HA) controller that manages the HAG to cause the HA controller to reconfigure the HAG to forward packet data traffic according to the redistributing of the packet data traffic from the first access link to the second access link.

4. The method of claim 1, further comprising:
   receiving, by the HACF, second performance information for the second access link,
   wherein computing the distribution parameters comprises computing, by the HACF, the distribution parameters as a function of the first performance information and the second performance information.

5. The method of claim 1,
   wherein the first access link comprises an access link connected to the HCPE, and
   wherein the first performance information for the first access link comprises an indication of access link usage of the first access link.

6. The method of claim 1, wherein computing the distribution parameters comprises:
   computing, by the HACF, the distribution parameters based further on determining that topology information of the hybrid access network indicates that the first access link and the second access link both offer reachability from the HCPE to the HAG.

7. The method of claim 1, further comprising:
   forwarding, by the one or more access devices, after reconfiguration by the controller, a first sub-flow of the packet data traffic via the first access link; and
   forwarding, by the one or more access devices, after the reconfiguration by the controller, a second sub-flow of the packet data traffic via the second access link.

8. The method of claim 1, wherein the violated performance threshold is selected to meet Quality of Service (QoS) requirements for a network slice in a 5G mobile network.

9. The method of claim 8, wherein computing the distribution parameters comprises:
   computing, by the HACF, the distribution parameters to meet the QoS requirements for the network slice.

10. The method of claim 1, wherein each of the one or more access devices comprises a hybrid access device, an optical access network device, or a 3GPP access network device.

11. A computing system comprising:
   processing circuitry having access to a storage device, the storage device comprising instructions to cause the processing circuitry to implement a hybrid access configuration function (HACF) for a hybrid access network to:
      receive first performance information for a first access link for a first access network operating according to a first broadband access technology, wherein the hybrid access network comprises the first access network, a hybrid access customer premises equipment (HCPE), and a hybrid access gateway (HAG);
      in response to detecting, based on the first performance information, a performance threshold violation impacting packet data traffic on the first access link, compute distribution parameters for redistributing packet data traffic from the first access link to a second access link for a second access network operating according to a second broadband access technology, wherein the hybrid access network comprises the second access network; and
      output the distribution parameters to a controller that manages one or more access devices to cause the controller to reconfigure the one or more access devices to forward packet data traffic according to the redistributing of the packet data traffic from the first access link to the second access link,
   wherein to output the distribution parameters to the controller, the instructions cause the processing circuitry to one or more of:
      output one or more of the distribution parameters to a radio access network (RAN) controller to cause the RAN controller to reconfigure a base station to forward packet data traffic according to the redistributing of the packet data traffic from the first access link to the second access link; or
      output one or more of the distribution parameters to an optical line termination (OLT) controller to cause the OLT controller to reconfigure one or more of an Optical Network Unit (ONU) or an OLT equipment to forward packet data traffic according to the redistributing of the packet data traffic from the first access link to the second access link.

12. The computing system of claim 11,
   wherein the one or more access devices comprises the hybrid access customer premises equipment (HCPE),
   wherein the HCPE is coupled to the first access link and the second access link,
   wherein to receive the first performance information, the instructions cause the processing circuitry to receive the first performance information from the HCPE, and
   wherein to output the distribution parameters to a controller, the instructions cause the processing circuitry to output one or more of the distribution parameters to a hybrid access (HA) controller that manages the HCPE to cause the HA controller to reconfigure the HCPE to forward packet data traffic according to the redistributing of the packet data traffic from the first access link to the second access link.

13. The computing system of claim 11,
   wherein the one or more access devices comprises the hybrid access gateway (HAG),
   wherein the HAG is coupled to the first access link and the second access link,
   wherein to receive the first performance information, the instructions cause the processing circuitry to receive the first performance information from the HAG, and
   wherein to output the distribution parameters to a controller, the instructions cause the processing circuitry to output one or more of the distribution parameters to a hybrid access (HA) controller that manages the HAG to cause the HA controller to reconfigure the HAG to forward packet data traffic according to the redistributing of the packet data traffic from the first access link to the second access link.

14. A method comprising:
   receiving, by a hybrid access configuration function (HACF) for a hybrid access network comprising a hybrid access customer premises equipment (HCPE) and a hybrid access gateway (HAG), performance information for an access link for an access network operating according to a broadband access technology;
   in response to detecting, by the HACF based on the performance information, a performance threshold violation impacting packet data traffic on the access link, computing, by the HACF, a capacity of an access network device dedicated to serving the packet data traffic traversing the access link, the access network device comprising one of a hybrid access device, an optical access network device, or a 3GPP access network device; and
   outputting, by the HACF, a message to a controller that manages the access network device configured to cause the controller to reconfigure the access network device with the computed capacity,
   wherein outputting the message to the controller comprises one or more of:
      outputting, by the HACF, the message to a radio access network (RAN) controller to cause the RAN controller to reconfigure a base station with the computed capacity; or
      outputting, by the HACF, the message to an optical line termination (OLT) controller to cause the OLT controller to reconfigure one or more of an Optical Network Unit (ONU) or an OLT equipment with the computed capacity.

15. The method of claim 14, wherein the violated performance threshold is selected to meet Quality of Service (QoS) requirements for a network slice in a 5G mobile network.

16. The method of claim 15, wherein computing the capacity comprises:

computing, by the HACF, the capacity to enable the access network device to meet the QoS requirements for the network slice.

* * * * *